T. MERRIAM.

Covering for Steam-Boilers.

No. 8,745. Reissued June 10, 1879.

Witnesses:

Chas A Smith

E. A. Merriam

Inventor:

Truman Merriam

N. PETERS, PHOTO-LITHOGRAPHER, WASHINGTON, D. C.

UNITED STATES PATENT OFFICE.

TRUMAN MERRIAM, OF MILWAUKEE, WISCONSIN.

IMPROVEMENT IN COVERINGS FOR STEAM-BOILERS.

Specification forming part of Letters Patent No. 156,711, dated November 10, 1874; Reissue No. 8,745, dated June 10, 1879; application filed December 19, 1878.

*To all whom it may concern:*

Be it known that I, TRUMAN MERRIAM, of Milwaukee, Wisconsin, have invented an Improvement in Coverings for Steam-Boilers, or other bodies from which it is desirable to prevent the radiation of heat; and I do hereby declare the following to be a full, clear, and exact description of the same, reference being had to the accompanying drawings, making a part of this specification, in which—

Figure 1:
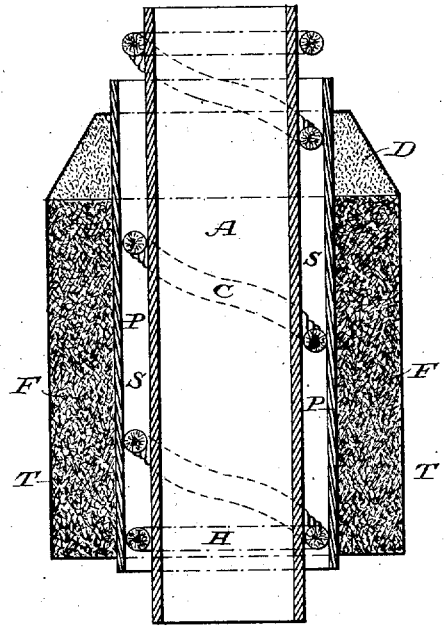
Figure 2:
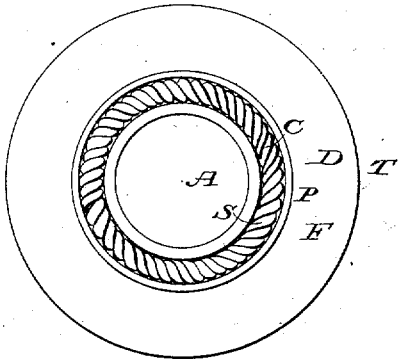

Figure 1 is a longitudinal sectional view, and Fig. 2 an end view, of a pipe upon which, in this instance, I will illustrate my invention.

About this pipe I wind a suitable bad conductor, C H. This may be of cord covered with cement, if desired; for as cord is of a perishable nature under the influence of heat, the cement will maintain its form and act as a support after the cord is completely charred.

It is also desirable that the support should be round, so that a small portion of its surface only may come in contact with the pipe A or the paper C, and that the least possible amount of heat may be communicated from one to the other. This support is wound spirally about the pipe, as shown, whereby a continuous dead-air chamber or space is left between the pipe A and paper P.

On the outside of this paper I may lay hair felt F, covered on both sides with the compound for which Letters Patent were granted me November 10, 1874, No. 156,710; or, instead of the hair felt, I may use a cement made of clay, as shown at D, Fig. 1.

I claim—

1. In combination with the pipe, and an intermediate support resting upon and extending spirally around it, the paper covering P, whereby a continuous dead-air chamber is formed about the said pipe, as set forth.

2. In combination with the pipe and the paper covering and intermediate support placed spirally around the pipe and forming a continuous dead-air chamber, the cement F and coating T, as set forth.

3. In combination with a pipe, and paper covering, an intermediate support of cord coated with cement, arranged about it substantially as described, to form a continuous dead-air chamber, for the purpose set forth.

TRUMAN MERRIAM.

Witnesses:
CHAS. A. SMITH,
E. A. MERRIAM.